(12) United States Patent
Al-Muaili et al.

(10) Patent No.: US 11,235,427 B2
(45) Date of Patent: Feb. 1, 2022

(54) METHOD OF TESTING ERW PIPE WELD SEAM FOR SUSCEPTIBILITY TO HYDROGEN EMBRITTLEMENT

(71) Applicant: Saudi Arabian Oil Company, Dhahran (SA)

(72) Inventors: Saad M. Al-Muaili, Dammam (SA); Mohammed A. Al-Anezi, Dhahran (SA); Khalid A. Ba Bakri, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 180 days.

(21) Appl. No.: 16/773,485

(22) Filed: Jan. 27, 2020

(65) Prior Publication Data

US 2021/0229221 A1    Jul. 29, 2021

(51) Int. Cl.
  *B23K 31/12* (2006.01)
  *G01N 17/00* (2006.01)
  *B23K 101/04* (2006.01)

(52) U.S. Cl.
  CPC ............ *B23K 31/12* (2013.01); *G01N 17/00* (2013.01); *B23K 2101/04* (2018.08); *G01N 2203/0236* (2013.01); *G01N 2203/0296* (2013.01)

(58) Field of Classification Search
  CPC ........... G01N 17/00; G01N 2203/0017; G01N 2203/0236; G01N 2203/024; G01N 2203/0296; G01N 2203/0298; G01N 3/08
  See application file for complete search history.

(56) References Cited

U.S. PATENT DOCUMENTS

| 4,153,454 A | 5/1979 | Emi et al. |
| 4,245,698 A * | 1/1981 | Berkowitz ............ C22C 19/055 148/410 |

(Continued)

FOREIGN PATENT DOCUMENTS

| CN | 106248571 A | 12/2016 |
| CN | 107991455 A | 5/2018 |
| JP | 2010236930 A | 10/2010 |

OTHER PUBLICATIONS

Anonymous, "Standard Test Method, Evaluation of Pipeline and Pressure Vessel Steels for Resistance to Hydrogen-Induced Cracking", ANSI/NACE Standard TM0284-2003, Item No. 21215, 2003, 15 pages.

(Continued)

*Primary Examiner* — Natalie Huls
(74) *Attorney, Agent, or Firm* — Bracewell LLP; Constance Gall Rhebergen (57) ABSTRACT

A method of managing a tubular having a seam that exhibits signs of hydrogen induced cracking that extends radially along the seam, and which is different from classic step-wise cracking. Included in the method is evaluating the strength and ductility specimens taken from the tubular that have been hydrogen charged; and which provides an indication if the seam is susceptible to hydrogen embrittlement. The strength is evaluated by comparing tensile strength of the hydrogen charged specimen with that specified in an industry standard, such as API 5L. The ductility is evaluated based on comparing percent elongation of the hydrogen charged specimen with percent elongation of a specimen obtained from the tubular and not hydrogen charged. Tubulars with seams found susceptible to hydrogen embrittlement would (Continued)

not be put into sour service, whereas those found not susceptible to hydrogen embrittlement can be put in a sour service.

17 Claims, 5 Drawing Sheets

(56) References Cited

U.S. PATENT DOCUMENTS

| | | | |
|---|---|---|---|
| 4,942,922 A | | 7/1990 | Redmerski et al. |
| 5,555,916 A | | 9/1996 | Kushida |
| 6,149,862 A | * | 11/2000 | Gliklad ................ C22C 38/001 |
| | | | 420/104 |
| 7,723,643 B2 | | 5/2010 | Hackel et al. |
| 8,821,653 B2 | | 9/2014 | Anelli et al. |
| 9,222,871 B2 | | 12/2015 | Roumeau et al. |
| 9,931,715 B2 | * | 4/2018 | Kanasaki ............... B23K 9/232 |
| 10,295,508 B2 | | 5/2019 | Traidia et al. |
| 2005/0061404 A1 | * | 3/2005 | Erike ..................... C22C 38/18 |
| | | | 148/546 |
| 2011/0100131 A1 | * | 5/2011 | Brown ................. G01M 5/0033 |
| | | | 73/761 |
| 2014/0238145 A1 | * | 8/2014 | Tran ......................... G01N 3/20 |
| | | | 73/851 |
| 2018/0364138 A1 | * | 12/2018 | Traidia ..................... G01N 3/04 |

OTHER PUBLICATIONS

Anonymous, "Standard Test Method, Laboratory Testing of Metals for Resistance to Sulfide Stress Cracking and Stress Corrosion Cracking in H2S Environments", ANSI/NACE Standard TM0177-2005, Item No. 21212, 2005, 43 pages.

English Translation of CN107991455, publication date of May 4, 2018, and referenced in the ISRWO for PCT/US2021/014867 mailed on Apr. 6, 2021.

English Translation of JP2010-236930, publication date of Oct. 21, 2010, and referenced in the ISRWO for PCT/US2021/014867 mailed on Apr. 6, 2021.

International Search Report and Written Opinion of the International Searching Authority issued in the prosecution of International Application No. PCT/US2021/014867, dated Apr. 6, 2021, 16 pages.

* cited by examiner

METHOD OF TESTING ERW PIPE WELD SEAM FOR SUSCEPTIBILITY TO HYDROGEN EMBRITTLEMENT

BACKGROUND OF THE INVENTION

1. Field of Invention

The present disclosure relates to a method of testing for hydrogen embrittlement of electric resistance welded ("ERW") pipe seams or high frequency welded ("HFW") pipe seams. More specifically, the present disclosure relates to a method of testing if the weld area of ERW/HFW is susceptible to hydrogen embrittlement after hydrogen charging.

2. Description of Prior Art

Fluids handling equipment, such as vessels, pipes, pumps, valves and the like, are often fabricated from ferrous based materials; which are susceptible to damage when exposed to certain fluids. Examples of the types of damage include oxidation, corrosion, and hydrogen embrittlement. The damage sometimes causes cracks in the equipment, which in severe cases form a path of disassociated material through a sidewall of the equipment. In some instances, the propagating crack causes catastrophic failure of the equipment; which is especially hazardous to personnel when the fluid is at high pressures.

Methods exist to test if an article for handling fluid is susceptible to damage from a fluid before exposing the article to that fluid. If the material making up the article is found susceptible to damage, an article made from a different material can then be considered for the particular service. One such test is NACE TM0284 which involves obtaining a specimen from the subject article, exposing the specimen to hydrogen sulfide, and conducting a metallographic exam to check for signs of hydrogen induced cracks. The NACE TM0284 test considers cracks in an article that are in what is referred to as those in a "step-wise" orientation. Cracks arranged in a step-wise orientation generally are those that extend in a direction parallel with a plate rolled direction of the article, and which are spaced apart from one another along a thickness of the article. A need exists for testing the susceptibility of material to hydrogen embrittlement when hydrogen induced cracks are identified that are different from the classic step-wise orientation, such as cracks that extend perpendicular to the plated rolled direction of the material.

SUMMARY OF THE INVENTION

Described is a method of handling a tubular which includes obtaining specimens taken from the tubular that exhibit hydrogen induced cracks, hydrogen charging a first one of the specimens to define a hydrogen charged specimen, obtaining tensile test results of the hydrogen charged specimen, and determining the seam is susceptible to hydrogen embrittlement based on the percentage elongation of the hydrogen charged specimen. In one example, the hydrogen induced cracks are oriented radially along the seam. In an alternative, it is determined that the seam is susceptible to hydrogen embrittlement if the percent elongation of the hydrogen charged specimen is less the percent elongation of a reference specimen that is obtained from the tubular and maintained at ambient and by an amount that is at least around 5 percent. In an alternative the specimen that is hydrogen charged is obtained from a section of the tubular having a length extending along a circumference of the tubular and that intersects the seam on the tubular. In an example, the step of obtaining specimens takes place after a preliminary specimen taken from the tubular is subjected to testing in accordance with NACE TM0284. The step of hydrogen charging optionally involves exposing the specimen to hydrogen sulfide for a period of time up to 120 hours. The method further alternatively includes determining the seam is not susceptible to hydrogen embrittlement if (1) the tensile strength of the hydrogen charged specimen is at least as great as the minimum specified for the applicable grade as provided in API 5L and (2) the percent elongation of the specimen having properties that are substantially the same as the tubular exceeds the percent elongation of the hydrogen charged specimen by an amount less than around 5 percent. In this example, the tubular is a first tubular, and the method further includes obtaining a second tubular that is the same or similar to the first tubular, and installing the second tubular in a service exposing the second tubular to a sour service if it is determined the seam in the first tubular is not susceptible to hydrogen embrittlement. In another example, the tubular is a first tubular and the method further includes repeating the aforementioned steps using a second tubular if it is determined the first tubular is susceptible to hydrogen embrittlement.

Another method of handling a tubular includes identifying a tubular having hydrogen induced cracks oriented radially with respect to an axis of the tubular, obtaining specimens taken from a seam in the tubular, hydrogen charging one of the specimens to define a hydrogen charged specimen, obtaining tensile test results of the hydrogen charged specimen, obtaining tensile test results of a reference specimen having material properties that are substantially the same as material properties of the tubular, and determining the seam in the tubular is susceptible to hydrogen embrittlement if (1) the tensile strength of the hydrogen charged specimen is less than the minimum specified for the applicable grade as provided in API 5L and (2) the percent elongation of the hydrogen charged specimen is less the percent elongation of the reference specimen by an amount that is at least around 5 percent. Specimens are optionally taken from seam portions of the tubular. The method further optionally includes determining the seam in the tubular is not susceptible to hydrogen embrittlement if (1) the tensile strength of the hydrogen charged specimen is at least as great as the minimum specified for the applicable grade as provided in API 5L and (2) the percent elongation of the reference specimen is not greater than the percent elongation of the hydrogen charged specimen by more than 5 percent, and if it is determined that the seam in the tubular is not susceptible to hydrogen embrittlement the tubular, or other tubulars manufactured the same or similar to the tubular are put into a sour service.

Another method of handling a tubular includes obtaining specimens taken from a tubular having hydrogen induced cracks, hydrogen charging a first one of the specimens to define a hydrogen charged specimen, obtaining strength and ductility values of the hydrogen charged specimen, and determining the seam in the tubular is susceptible to hydrogen embrittlement based on the strength and ductility values. In this example, the strength and ductility values optionally include tensile strength and elongation of the hydrogen charged specimen. In one alternative, the method further includes comparing the tensile strength with a standard tensile strength of a material having the same properties as the specimen that is subjected to hydrogen charging. A further optional step to the method includes comparing a percent elongation of the hydrogen charged specimen with a reference specimen obtained from the tubular, where the reference specimen was maintained at ambient.

BRIEF DESCRIPTION OF DRAWINGS

Some of the features and benefits of the present invention having been stated, others will become apparent as the description proceeds when taken in conjunction with the accompanying drawings, in which.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the terms "around" and "about" includes +/−5% of a cited magnitude. In an embodiment, the term "substantially" includes +/−5% of a cited magnitude, comparison, or description. In an embodiment, usage of the term "generally" includes +/−10% of a cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Figure 1:
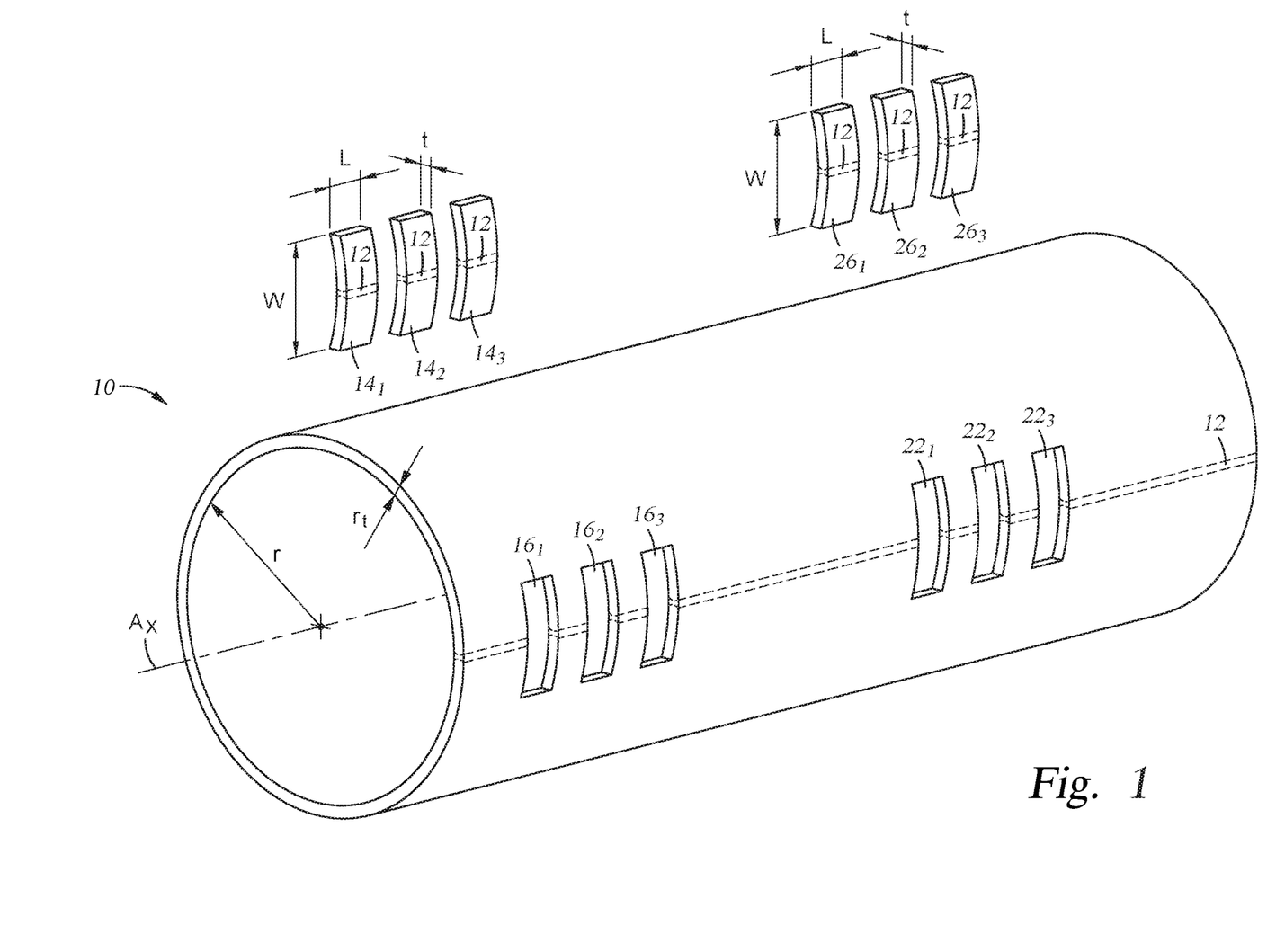
FIG. 1 is a perspective view of an example of a tubular having specimens removed for testing.

In perspective view in FIG. 1 is an example of a tubular 10 depicted as an annular member having an axis $A_X$ and radius r. In an example, the tubular 10 is formed by rolling a planar member (not shown) so that ends of the planar member that extend perpendicular to the rolling direction abut one another, and fusing those ends to one another into the annular configuration of FIG. 1. In an example, fusing includes migration of material from one of the abutting ends into the other abutting end, and optionally vice versa; and which defines a fused region having material from each of the abutting ends. A seam 12 is illustrated in this example extending parallel to axis $A_X$, which represents a weld line where the abutting ends are affixed to one another. In an example, the weld line includes the fused region. Embodiments exist that the seam 12 is formed from an electric resistance weld ("EFW"), or a high frequency weld ("HFW").

Specimens $14_{1-3}$ are shown that have been excised from the tubular 10, and having material the same as tubular 10 so that testing specimens $14_{1-3}$ yields information about and relevant to the seam 14, the tubular 10, and material making up the tubular 10. A thickness of the specimens $14_{1-3}$ is the same as the radial thickness $r_t$ of the tubular 10, so that gathering the specimens $14_{1-3}$ from the tubular 10 forms corresponding slots $16_{1-3}$ that extend through the sidewall of the tubular 10. In the example of FIG. 1, the specimens $14_{1-3}$ are strategically obtained from the tubular 10 so that their elongate sides extend along a circumference of the tubular 10; and a portion of each of the specimens $14_{1-3}$ contains a portion of the seam 12. In an example, the specimens $14_{1-3}$, $26_{1-3}$, are obtained from tubular 10 in accordance with ASTM A370; which is incorporated by reference herein in its entirety and for all purposes.

Still referring to FIG. 1, another set of transverse slots $22_{1-3}$ are shown spaced axially away from the transverse slots $16_{1-3}$. Transverse slots $22_{1-3}$ were formed by obtaining transverse specimens $26_{1-3}$ from tubular 10. As will be described in more detail below, transverse specimens $14_{1-3}$ are selectively hydrogen charged and subjected to strength and ductility testing to assess if the seam 10 is susceptible to hydrogen embrittlement. In a non-limiting example, transverse specimens $26_{1-3}$ are maintained at ambient conditions and used as reference or control specimens. Further illustrated in FIG. 1 is that transverse specimens $14_{1-3}$ and transverse specimens $26_{1-3}$ each have a width W, which is generally aligned with the circumference of tubular 10; and a length L which is generally aligned with the axis $A_X$ of tubular 10. Alternate embodiments exist having more than or less than three of the transverse specimens $14_{1-3}$, $26_{1-3}$.

Figure 2:
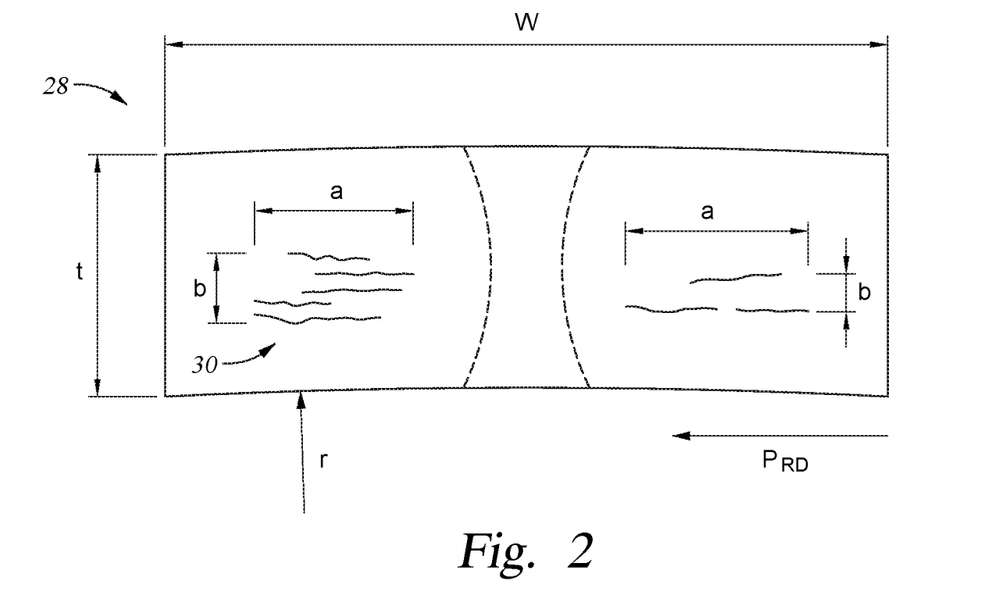
FIG. 2 is an elevational view of an end of a specimen of FIG. 1 which exhibits step wise hydrogen induced cracking.

Shown in FIG. 2 is an example of an elevational view of a specimen 28 that includes seam 12, and which was obtained prior to when specimens $14_{1-3}$, $26_{1-3}$ were gathered from the tubular 10 of FIG. 1. Cracks 30 are shown on specimen 28 that are in a pattern or arrangement that is consistent with classical hydrogen induced step-wise cracking. As shown, the cracks 30 extend generally perpendicular with a radius r of the tubular 10 and at different locations of thickness t within the specimen 28. In a non-limiting example, the specimen 28 and or tubular 10 was subjected to a test in accordance with NACE TM0248 using solution A; which involves exposing the specimen 28 to a hydrogen sulfide environment intended to introduce signs of hydrogen induced cracking if any portion of the tubular 10 is susceptible to damage when exposed to a sour service. Further illustrated in FIG. 2 is that the length and height of the collection of the hydrogen induced cracks 30 are represented respectively by callouts "a" and "b". As is known, various ratios of values of a and b are used to evaluate and classify the amount of hydrogen induced cracking in a specimen. For the purposes of reference, also illustrated is an arrow $P_{RD}$ which depicts an example of a plate rolling direction when forming the tubular 10 from where the specimen 28 is obtained. Using values of a and b, a crack length ratio ("CLR") is calculated, and which is equal to the sum of the values of a (lengths of the cracks 30), divided by W (the section width of the specimen), and multiplied by 100.

Figure 3:
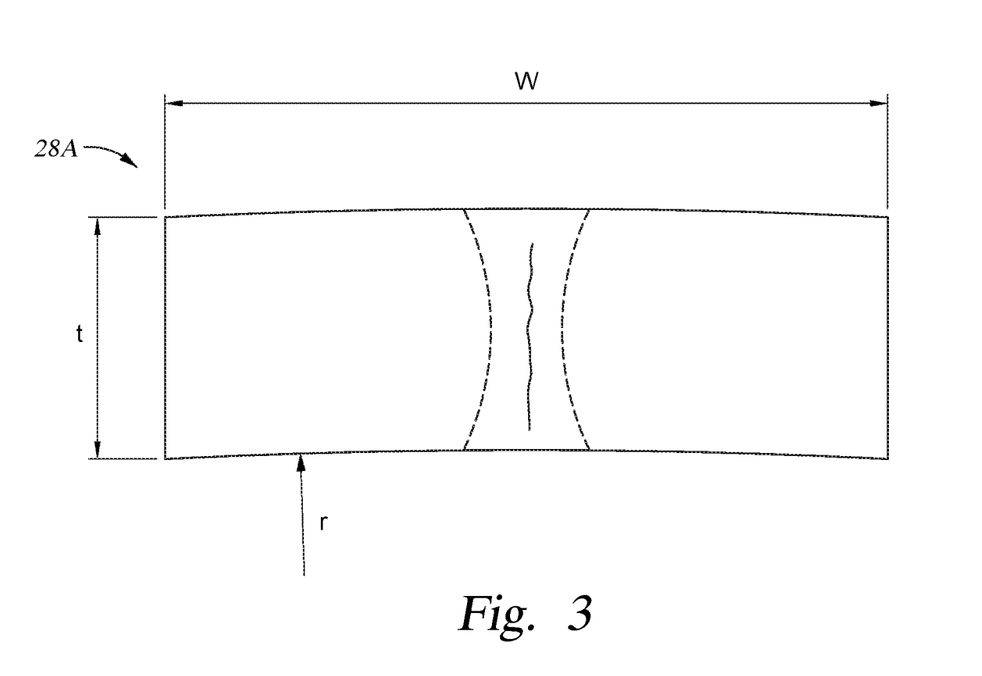
FIG. 3 is an elevational view of an end of a specimen of FIG. 1 which exhibits hydrogen cracking that is different from the classical step wise hydrogen induced cracking.

Referring now to FIG. 3, an example of a radial hydrogen induced crack 32 is shown in specimen 28A and projecting through seam 12A. Crack 32 is generally transverse to the classic step-wise hydrogen induced cracks 30 of FIG. 2, and oriented substantially parallel with radius r of tubular 10 and along the thickness t of sidewall of tubular 10. Currently known methods of evaluating materials for hydrogen induced cracking do not address hydrogen induced cracks that extend radially through a seam or weld line, such as the crack 32 of FIG. 3. Described here is an example method of evaluating susceptibility of a seam or weld line to hydrogen embrittlement, where that seam or weld line has exhibited hydrogen induced cracking in a radial direction such as that illustrated in FIG. 3. One embodiment of the method of evaluating includes testing the strength and ductility of portions of the tubular having the seam or weld line.

Figure 4:
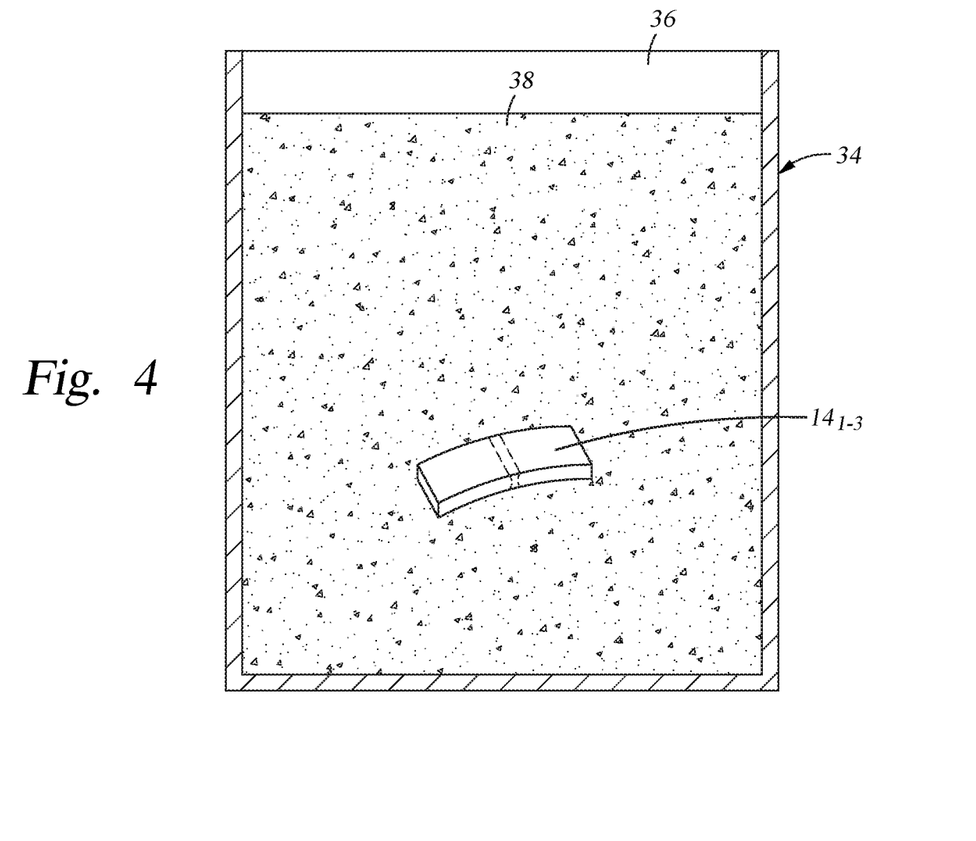
FIG. 4 is an elevational view of an example of a specimen of FIG. 1 being exposed to a test fluid.

In an example, a susceptibility of a seam or weld line of a tubular to hydrogen embrittlement when exposed to a sour service is assessed by evaluating the strength and/or ductility of specimens obtained from the tubular and which include portions of the seam 12. In an alternative, the seam 12 has exhibited non-classical step-wise hydrogen induced cracking. A non-limiting example of testing the strength and ductility of a material exhibiting one or more hydrogen induced radial cracks includes hydrogen charging some of the specimens obtained from the tubular 10. In the example of FIG. 4 specimens $14_{1-3}$ are the specimens being hydrogen charged. Also in FIG. 4 is a container 34 which is schematically represented with sidewalls that define an inner cavity 36. The specimens $14_{1-3}$ are disposed in the cavity 36 with a reagent 38. In one embodiment, the reagent 38 includes what is referred to as solution A of NACE TM0284; which is incorporated by reference herein in its entirety and for all purposes. Further in this example, the specimens $14_{1-3}$ are hydrogen charged within the container 34 and for a period of up to 120 hours. Optionally, the hydrogen charging takes place for up to about 96 hours. In an alternative, the step of hydrogen charging involves immersing the specimens $14_{1-3}$ in an aqueous sulfide solution. In one embodiment, the test procedure described herein is a complimentary test to evaluate materials that show indication after hydrogen induced cracking, such as per NACE TM0284, or is used in any evaluation of material or a welded tubular where the hydrogen induced cracking test results have been found inconclusive.

Figure 5:
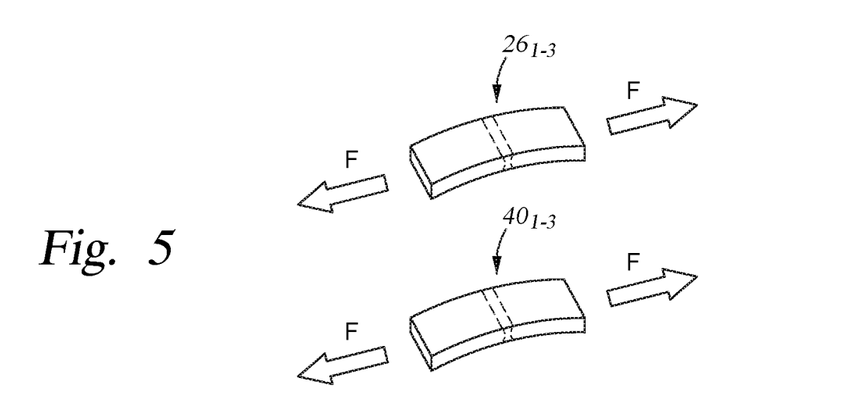
FIG. 5 is a schematic example of specimens of FIG. 1 being subjected to tensile testing.

In this example, hydrogen charged specimens $40_{1-3}$ are formed by exposing the specimens $14_{1-3}$ to the reagent 38 as described above. Alternatively, the hydrogen charged specimens $40_{1-3}$ are formed by placing the transverse specimens $14_{1-3}$ in an acidified brine solution combined with acetic acid that is dissolved in distilled or deionized water and that is saturated at hydrogen sulfide at ambient temperature and pressure. Examples exist where the hydrogen charging and tests are taken at standard temperature and pressure, such as that stipulates in NACE TM-0284. The transverse specimens $26_{1-3}$ are maintained in an ambient environment after being removed from the tubular 10 (FIG. 1), and not subjected to agents that cause or promote hydrogen induced cracking. An example of testing the strength ("strength test") of the specimens $26_{1-3}$, $40_{1-3}$ is shown in FIG. 5, and which in this example depicts a tensile test. Illustrated in this example is that a force F is applied to opposing ends of the specimens $26_{1-3}$, $40_{1-3}$. Example steps of the tensile test or strength test include increasing a magnitude of the force F applied to the ends of the specimens $26_{1-3}$, $40_{1-3}$ and observing the changes in the specimens $26_{1-3}$, $40_{1-3}$ with the varying magnitudes of the applied force F. Examples of observed changes in the specimens $26_{1-3}$, $40_{1-3}$ include deformation, elongation, reduction in area, and fracture. In an embodiment, material characteristics of the specimens $26_{1-3}$, $40_{1-3}$, such as ultimate tensile strength, elongation, percent elongation, reduction in area, yield strength; are based on monitoring magnitudes of the applied force F that correspond with the changes observed in the specimens $26_{1-3}$, $40_{1-3}$. Examples exist where tensile or strength testing is conducted on a single one of the specimens $26_{1-3}$, $40_{1-3}$, more than one of the specimens $26_{1-3}$, $40_{1-3}$, or all of the specimens $26_{1-3}$, $40_{1-3}$. The tensile testing is optionally conducted in accordance with standards set out in ASTM 370 and ISO 6892. The tensile testing example of FIG. 5 is not limited to procedures under ASTM 8370, and can include other ways of evaluating the strength and/or ductility of the specimens. The material characteristics noted above are optionally based a maximum, minimum, or average value of force F recorded during the above described tensile testing. In an example, an average tensile strength and an average percent elongation are estimated from values obtained from one or more of the hydrogen charged specimens $40_{1-3}$ and one or more of the transverse specimens $26_{1-3}$. In an alternative, the percent of elongation after fracture during the tensile test is reported with reference to a gauge length or initial length of specimen of 50 millimeters (2 inches).

Figure 6:
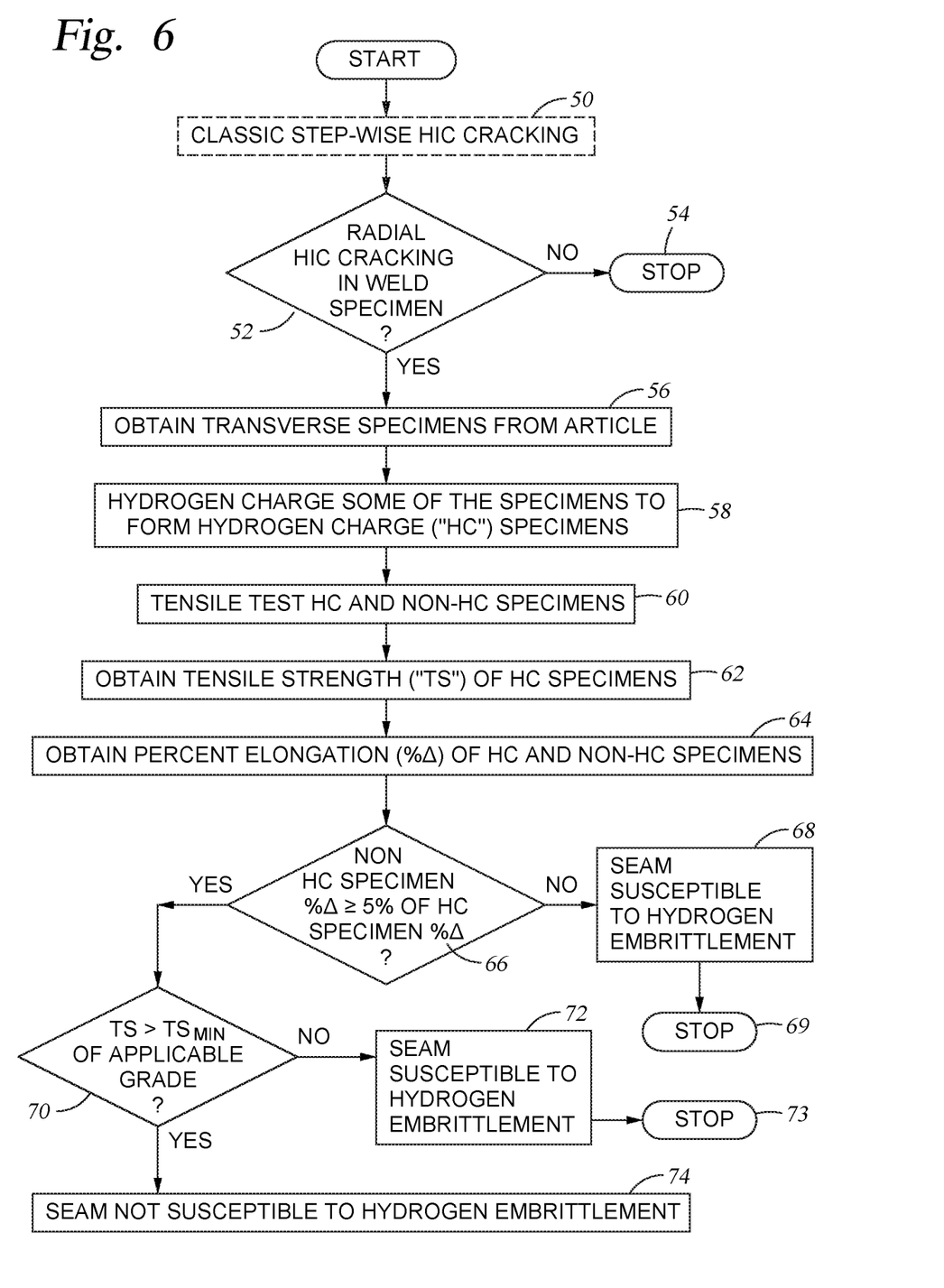
FIG. 6 is a schematic having a flowchart of an example of a method of testing a weld specimen.

Shown in FIG. 6 is a flowchart 49 illustrating an example of a method in which a determination is made that the seam 12 or weld line in the tubular 10 (FIG. 1) is or is not susceptible to hydrogen embrittlement. In step 50 if classic step-wise hydrogen induced cracking ("HIC") is observed on the tubular 10 or on specimens gathered from the tubular 10; then in step 52 an examination for radial HIC cracks is conducted. In an alternative, the method does not include step 50, but begins with the detection of radial HIC cracks in step 52. If no radial cracks are found in the seam 12 of tubular 10 or associated specimen, the method terminates in step 54. In one alternative, other evaluation procedures are conducted on the tubular 10 or associated specimen after the present method is terminated. If radial HIC cracks are detected during step 52 the example method proceeds to step 56 and during which specimens are obtained from the tubular 10. In step 58, some of the specimens are hydrogen charged to create hydrogen charged ("HC") specimens. In an alternative, the hydrogen charging of step 58 is the same or substantially similar to that described above and shown in FIG. 4. In an embodiment, the HC specimens of step 58 are the same or substantially similar to hydrogen charged specimens $40_{1-3}$. Specimens not hydrogen charged are referred to as non-HC charged specimens, and alternatively are the same or substantially similar to the specimens $26_{1-3}$. The example method proceeds to step 60 where the HC and non-HC specimens are tensile tested. Tensile testing in one example is conducted in the same or substantially similar manner as described above and as illustrated in FIG. 5. Based on the tensile test of step 60; in step 62 values of tensile strength of the non-HC specimens are obtained, and in step 64 percent elongation values of the HC and non-HC specimens are obtained. Further optionally evaluated during the tensile test of step 60 is a reduction in area of the specimens $40_{1-3}$ and $26_{1-3}$. In step 66 the percent elongation of the hydrogen charged specimens $40_{1-3}$ is compared with the percent elongation of the reference specimens $26_{1-3}$. If the percent elongation of the reference specimen $26_{1-3}$ exceeds the percent elongation of the hydrogen charged specimens $40_{1-3}$ by an amount greater than about 5 percent, then the method proceeds to step 68 where a determination is made that the seam 14 is susceptible to hydrogen embrittlement, and the method is terminated in step 69.

If the percent elongation of the reference specimen $26_{1-3}$ exceeds the percent elongation of the hydrogen charged specimens $40_{1-3}$ by an amount less than or equal to about 5 percent, then the method proceeds to step 70 where the tensile strength of the HC specimen is compared with material having an applicable grade. An example of an applicable grade of material is a material having substantially the same constituents of the material making up the specimen being tested, and in substantially the same percentages. Examples of standards that recite values of minimum tensile strength include as per API 5L and ISO 3183. One skilled possesses sufficient capabilities to identify an applicable grade of material and the associated minimum tensile strength. In step 70, if the tensile strength of the HC specimens measured in step 62 is less than the applicable pipe grade, then the method proceeds to step 72 where it is determined that the seam 14 is susceptible to hydrogen embrittlement. The positive determination in step 72 that the seam 14 is susceptible to hydrogen embrittlement the method terminates in step 73 and the tubular 10 having the seam 14 is not put into a sour service. Conversely, if in step 70 it is determined that the tensile strength of the HC specimens measured in step 62 is greater than the applicable pipe grade, then in step 74 a determination is made that the seam 14 is not susceptible to hydrogen embrittlement. With this determination of step 74, options exist that the tubular 10 having the seam 14, or another tubular that is the same or similar as the tubular 10 is put into a sour service. Examples of a same or similar tubular include one or more of a tubular from the same production batch as the tubular 10, a tubular made with the same or similar materials as the tubular 10, a tubular made using the same or similar manufacturing procedure as the tubular 10, and a portion of the tubular 10. In an alternate method, the order of steps 66 and 70 is switched so that the percent elongation evaluation of step 66 occurs after the tensile strength evaluation of step 70. In another alternative, steps 66 and 70 are consolidated in the same step. An optional criteria to determine that the tubular 10 being tested has a seam 14 that is not susceptible to hydrogen embrittlement is that the percent elongation of the HC specimen from step 64 be at least equal to the minimum specified for the applicable pipe grade as stipulated in API 5L.

Figure 7:
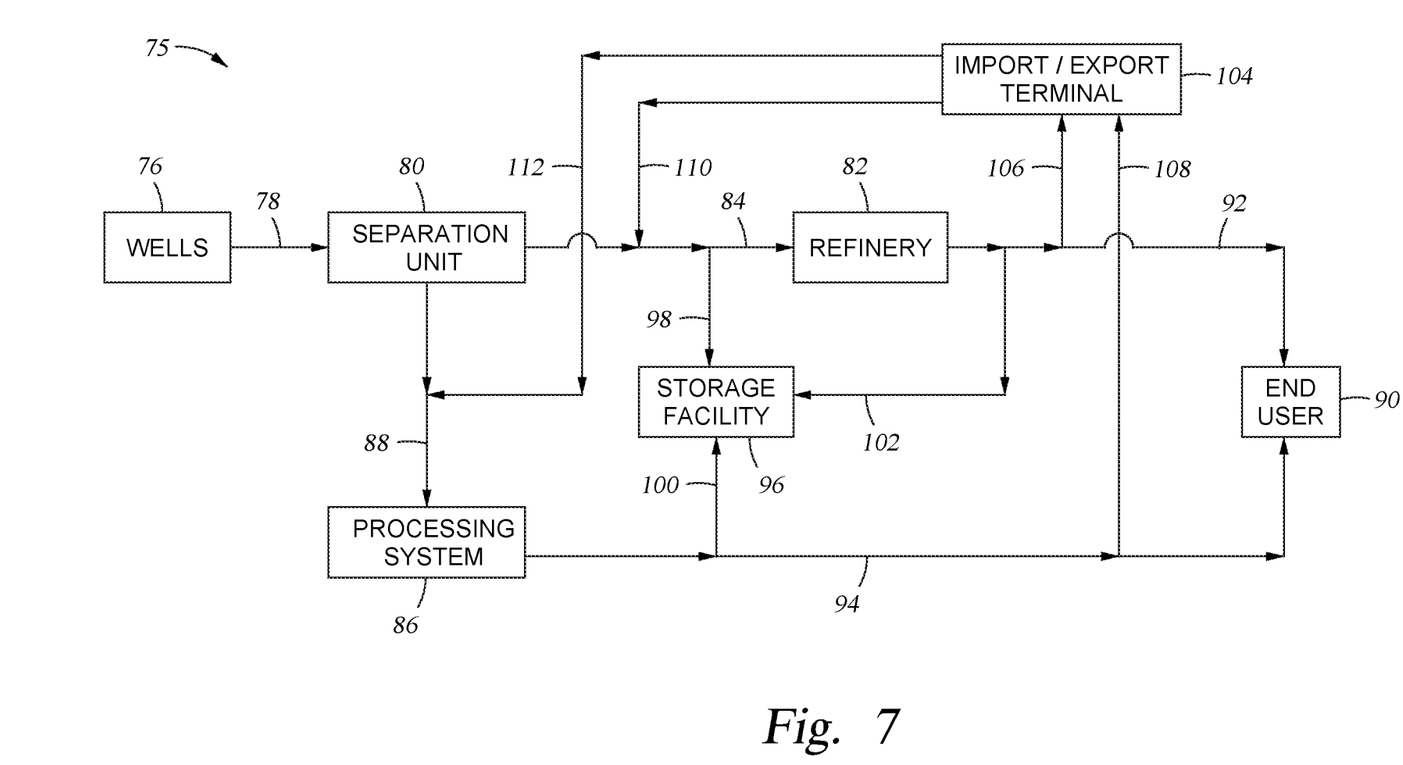
FIG. 7 is a schematic representation of a process having tubulars with seams determined to not be susceptible to hydrogen embrittlement.

Schematically illustrated in FIG. 7 is an example of a transmission circuit 75 in which fluids are handled, and having portions classified as being in a sour service. Wells 76 are included in the example transmission circuit 75, in this example the wells 76 are used to produce fluids from subterranean formations. Examples of the fluids produced include gas and liquid hydrocarbons, water, hydrogen sulfide; and examples of the wells 76 are land based and also offshore. Fluids from the wells 76 are transported through a transmission line 78 to a separation unit 80. Liquid hydrocarbons isolated in the separation unit 80 are sent to a refinery 84 for further processing through a transmission line 84, and gas hydrocarbons isolated are sent to a processing system 86 inside of a transmission line 88. Output from the refinery 82 is delivered to an end user 90 with transmission line 92. The end user 90 is also shown receiving gas processed in the processing system 86 through transmission line 94. Optionally, liquid in transmission line 84 is diverted to a storage facility 96 through transmission line 98, and alternatively receives gas in transmission line 94 through transmission line 100. Further optionally is that the output in transmission line 92 flows to storage facility 96 via transmission line 102. An import/export terminal 104 is also included in the example of the transmission circuit 75, and that optionally receives fluid from transmission line 92 through transmission line 106 and gas from transmission line 94 through transmission line 108. Alternatively, fluid delivered to the import/export terminal 104 is transmitted to transmission line 84 through line 110. Transmission line 112 is shown that provides a passage for gas at the import/export terminal 104 to be delivered to transmission line 88. In an example, transmission lines 78, 84, 92, 94, 98, 100, 102, 106, 108, 110, 112 include tubulars 10 having seams 12 (FIG. 1). Further in this example, at least some of the seams 12 are formed ERW or HFW processes, and are evaluated for suitability in a sour service. In an example, the evaluation is the same or similar to that described above and in conjunction with FIG. 6.

Test results of the method described herein optionally includes reporting of the crack length ratio ("CLR"), location and dimensions of specimens, and whether taken from a pipe or a vessel, the pH of the hydrogen sulfide saturated solution at the starting end of the test, the chemical composition of w tested, the tensile test results, including the ultimate tensile strength and elongation of the test stress strain sharp, photos of the test specimen before and after testing, photos of the fractured surface after the tensile test, metallography images of etched and non-etched specimens, and a hardness reading (i.e. Brinell, Rockwell, etc.).

In an alternate embodiment, the method described herein takes place after a standard hydrogen induced cracking testing for electron resistance welded or hydrogen high frequency induced welding pipes per NACE TM0284, API 5L has been performed. The testing optionally takes place at a manufacturing facility for forming or fabricating fluids handling articles, such as tubulars and/or vessels and containers. Not to be bound by theory, but steel that is not resistant to hydrogen induced cracking shows crack indications that are parallel to a plate rolling direction. The indications result from the hydrogen being charged, and then trapped in these steel trap sites. Trap sites and the steel introduce undesirable characteristics that weaken the steel and make it susceptible to failures when under an applied stress. It is thought that these trap sites are typically caused by excess manganese sulfide not purified from the steel during manufacturing of the steel. On the other hand and because the electrical resistance welded for high frequency induction pipe seams forged at pressing the pipe ends at high temperature conditions, the seam will involve a fusion line that is vertical to the plate thickness. Typical hydrogen induced cracking testing of this area is expected to show, or not show, hydrogen induced cracking indication parallel to the rolling direction but not along the fusion line.

In an example, a sour service is one that is defined in ISO-15156/NACE MR0175. Alternatively, a sour environment, which is spelled out in NACE MR0175/ISO-15156, part 2, paragraph 7.1.2 is "if the partial pressure of hydrogen sulfide in the gas is equal to or greater than 0.3 kPa (0.05 psi), SSC resistant steel shall be selected." In another alternative, a sour service is defined when there is greater than 50 ppmw total sulfide content in the aqueous phase, greater than or equal to 1 ppmw total sulfide content in the aqueous phase and pH less than four, or greater than 1 ppmw total sulfide content and greater than 20 ppmw free cyanide in the aqueous phase, and pH greater than 7.6. Example standards exist that any pipe and well joint (including ERW/HFI welded pipe) that is intended for sour service application must satisfy the requirements of the following standards: (1) API-5L (Annex H specifies chemistry, heat treatments requirements for the pipes container for sour service, and the required testing), as per the standard the weld is qualified mainly by hardness testing; (2) ISO-15156/ NACE MR0175 (defines the sour service defines the sour severity zones, specifies harness requirements, and heat treatment); and (3) NACE TM0284 (provides a test method for evaluation of pipeline and pressure vessel steel for resistance to hydrogen induced cracking). In light of the criteria for assessing suitability of a sour service application, these standards fail to address susceptibility of a steel to hydrogen embrittlement or the need to evaluate materials or sensitivity of the weld to the embrittlement. Unlike the NACE TM0284 which is an evaluation to the resistance of hydrogen induced cracking, the method described herein evaluates hydrogen embrittlement that occurs to a material after exposure to a hydrogen charging solution. In one example of the method described herein, specimens $14_{1-3}$, $26_{1-3}$ are all obtained from the same tubular 10.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A method of handling a tubular comprising:
    obtaining specimens taken from a tubular having a seam that exhibits hydrogen induced cracks;
    hydrogen charging a first one of the specimens to define a hydrogen charged specimen;
    obtaining tensile test results of the hydrogen charged specimen; and
    determining the seam is susceptible to hydrogen embrittlement based on the tensile strength of the hydrogen charged specimen and the percentage elongation of the hydrogen charged specimen.

2. The method of claim 1, wherein the hydrogen induced cracks are oriented along a thickness of the tubular.

3. The method of claim 1, wherein it is determined that the seam is susceptible to hydrogen embrittlement if the tensile strength of the hydrogen charged specimen is less than the minimum specified for the applicable grade as provided in API 5L.

4. The method of claim 1, wherein it is determined that the seam is susceptible to hydrogen embrittlement if the hydrogen charged specimen has a percent elongation that is less the percent elongation of a reference specimen by at least about 5 percent, and wherein the reference specimen is obtained from the tubular and maintained at ambient.

5. The method of claim 1, wherein the specimen that is hydrogen charged is obtained from a section of the tubular having a length extending along a circumference of the tubular and that intersects a seam on the tubular.

6. The method of claim 1, wherein the step of obtaining specimens takes place after a preliminary specimen taken from the tubular is subjected to testing in accordance with NACE TM0284.

7. The method of claim 1, wherein the step of hydrogen charging comprises exposing the specimen to hydrogen sulfide for a period of time up to 120 hours.

8. The method of claim 1, further comprising determining the seam is not susceptible to hydrogen embrittlement if (1) the tensile strength of the hydrogen charged specimen is at least as great as the minimum specified for the applicable grade as provided in API 5L and (2) the percent elongation of the hydrogen charged specimen is less than the percent elongation of a reference specimen by up to about 5 percent, and wherein the reference specimen has properties that are substantially the same as the tubular.

9. The method of claim 1, wherein the tubular comprises a first tubular, the method further comprising installing a second tubular made from the same material as the first tubular in a service exposing the second tubular to a sour service if it is determined the seam is not susceptible to hydrogen embrittlement.

10. A method of handling a tubular comprising:
    identifying a tubular having a seam with hydrogen induced cracks oriented radially with respect to an axis of the tubular;
    obtaining specimens taken from the tubular;
    hydrogen charging one of the specimens to define a hydrogen charged specimen;
    obtaining tensile test results of the hydrogen charged specimen;
    obtaining tensile test results of a reference specimen having material properties that are substantially the same as material properties of the tubular; and
    determining the seam is susceptible to hydrogen embrittlement if (1) the tensile strength of the hydrogen charged specimen is less than the minimum specified for the applicable grade as provided in API 5L and (2) the percentage elongation of the hydrogen charged specimen is less than the percent elongation of the reference specimen by an amount that is at least greater than about 5 percent.

11. The method of claim 10, further comprising determining the seam is not susceptible to hydrogen embrittlement if (1) the tensile strength of the hydrogen charged specimen is at least as great as the minimum specified for the applicable grade as provided in API 5L and (2) the percentage elongation of the hydrogen charged specimen is less than the percent elongation of the reference specimen by an amount up to about 5 percent.

12. The method of claim 11, further comprising using the tubular in a sour service if it is determined that the seam is not susceptible to hydrogen embrittlement.

13. The method of claim 11, wherein the tubular comprises a first tubular, the method further comprising using a second tubular in a sour service if it is determined that the seam is not susceptible to hydrogen embrittlement, and wherein the second tubular is the same or similar to the first tubular.

14. A method of handling a tubular comprising:
    obtaining specimens taken from the tubular having hydrogen induced cracks in a seam of the tubular;
    hydrogen charging a first one of the specimens to define a hydrogen charged specimen;
    obtaining strength and ductility values of the hydrogen charged specimen; and
    determining the seam is susceptible to hydrogen embrittlement based on the strength and ductility values.

15. The method of claim 14, wherein the strength and ductility values comprise tensile strength and elongation of the hydrogen charged specimen.

16. The method of claim 15, further comprising comparing the tensile strength with a standard tensile strength of a material having the same properties as the specimen that is subjected to hydrogen charging.

17. The method of claim 14, further comprising comparing a percent elongation of the hydrogen charged specimen with a reference specimen obtained from the tubular, wherein the reference specimen was maintained at ambient.

* * * * *